(12) United States Patent
Tremblay

(10) Patent No.: US 6,345,705 B1
(45) Date of Patent: Feb. 12, 2002

(54) SELF-CORRECTIVE VEHICLE SHOCK ABSORBER

(76) Inventor: Philip W. Tremblay, 1475 Avant Rd., Yulee, FL (US) 32097

( * ) Notice: Subject to any disclaimer, the term of this patent is extended or adjusted under 35 U.S.C. 154(b) by 0 days.

(21) Appl. No.: 09/560,602

(22) Filed: Apr. 28, 2000

(51) Int. Cl.⁷ .................................................. F16F 9/34
(52) U.S. Cl. ..................................... 188/266.2; 188/275
(58) Field of Search ................................ 188/378, 380, 188/275, 318, 316, 266.1, 266.2, 266.3, 266.4; 267/64.11, 136

(56) References Cited

U.S. PATENT DOCUMENTS

| | | | | |
|---|---|---|---|---|
| 1,094,567 A | * | 4/1914 | Hofmann | 267/64.11 |
| 1,268,452 A | * | 6/1918 | Goodyear | 188/275 |
| 2,722,288 A | * | 11/1955 | Steinbauer | 188/275 |
| 4,126,302 A | * | 11/1978 | Curnutt | 267/136 |
| 4,203,507 A | * | 5/1980 | Tomita et al. | 188/317 |
| 4,634,142 A | | 1/1987 | Woods et al. | |
| 4,722,548 A | | 2/1988 | Hamilton et al. | |
| 5,154,442 A | * | 10/1992 | Milliken | 188/266.2 |
| 5,383,680 A | | 1/1995 | Bock et al. | |

FOREIGN PATENT DOCUMENTS

JP          61-206837 A     *  9/1986 ............ 188/322.14

* cited by examiner

Primary Examiner—Robert J. Oberleitner
Assistant Examiner—Thomas J. Williams
(74) Attorney, Agent, or Firm—Thomas C. Saitta

(57) ABSTRACT

A shock absorber which is responsive to changes in inertia from turning, accelerating or stopping, the change in inertia blocking flow of damping fluid in the normal reactive direction and allowing flow in the opposite direction, the flow in the opposite or corrective direction being propelled by road surface features, such that the shock absorber will level the vehicle and over-correct against the effects of the inertia. Piston travel in the corrective direction is limited as the piston approaches either end of the cylinder by providing a flow path around the piston to prevent the piston contacting the end of the cylinder.

16 Claims, 9 Drawing Sheets

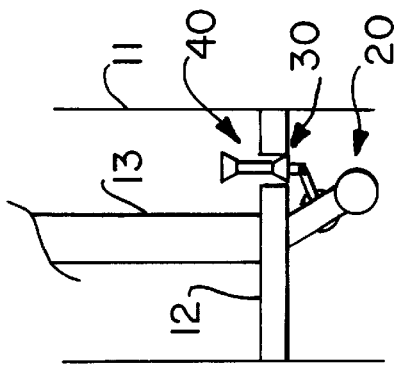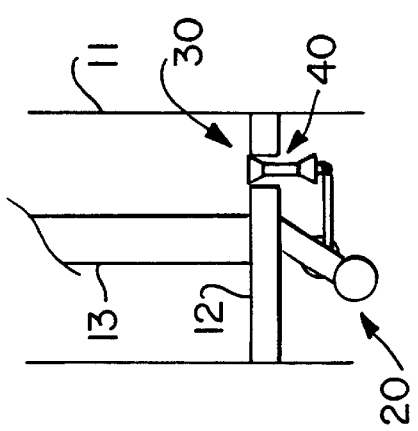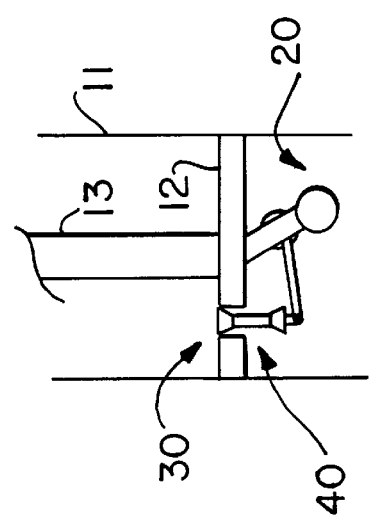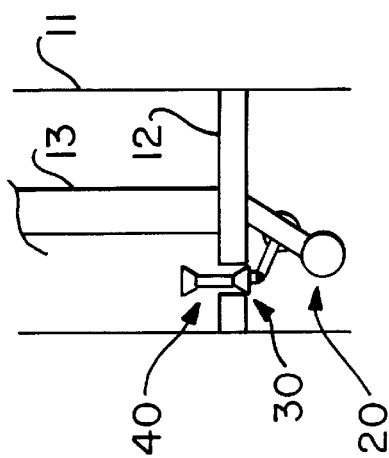

SELF-CORRECTIVE VEHICLE SHOCK ABSORBER

BACKGROUND OF THE INVENTION

This invention relates generally to shock absorber devices for damping unwanted vehicle motion, such as dipping, bouncing, swaying or leaning, the shock absorber having a reciprocating piston mounted within a cylinder containing a damping fluid, such as oil, where the damping fluid is allowed to flow from one side of the piston to the other in a controlled or restricted manner. More particularly, the invention relates to such devices which are provided with additional stabilizing means to further restrict or block the flow of the damping fluid to maintain the vehicle body in a more stabilized position where the vehicle body is swayed by centrifugal forces during a turn or dips during acceleration or braking. Even more particularly, the invention relates to such devices which further provide means to correct the vehicle body position during turns, acceleration or stops by directing flow of damping fluid in the opposite direction within the cylinder, and where means are provided to limit corrective action at either cylinder end.

Shock absorber devices for damping or reducing unwanted vehicle body motion, usually used in conjunction with large springs, are well known. A shock absorber typically comprises in its most simple form a sealed cylinder having a rod passing through one end, with the rod fastened to the vehicle chassis or body and the other end of the cylinder fastened to the axle, or vice versa. The piston divides the cylinder into an upper and a lower chamber containing a relatively viscous damping fluid. A flow aperture in the piston or a bypass conduit is provided to allow flow of the damping fluid from one side of the piston to the other. Thus when a wheel encounters a bump or a depression in the roadway, the spring member and shock absorber absorb the initial energy, with the shock absorber damping the effects due to the restricted flow of the damping fluid within the cylinder. This limits the tendency of the springs to continue bouncing and limits the amount of movement observed in the vehicle body.

Sudden directional movement or changes caused by turning, accelerating or braking have an undesirable effect on the vehicle body attitude or position due to the effects of inertia and centrifugal force. In a turn, the vehicle body leans in a negative manner due to these forces, with the movement of the vehicle body or chassis causing the piston to move within the cylinder. In a turn to the left, the vehicle right side dips and the vehicle left side rises. In a turn to the right, the opposite occurs. With rapid acceleration the vehicle rear squats and the vehicle nose rises. In stopping, the opposite occurs. The effect of centrifugal force on the turning vehicle is especially detrimental to safe control of the vehicle. Standard shock absorbers are designed to provide a compromise between comfort and road handling ability, such that they are structured in the mid-range between soft to absorb bumps and stiff to limit the unwanted sway, and as such are relatively susceptible to the effects of inertial or centrifugal forces.

Efforts have been made to develop a shock absorber which provides the desired cushioning when the vehicle is driven straight at steady speeds, while simultaneously providing means to stiffen the shock absorber during turns, acceleration or braking to prevent or lessen the centrifugal force effects of the vehicle body. Examples of such devices are seen in U.S. Pat. No. 2,722,288 to Steinbauer, U.S. Pat. No. 2,869,685 to Funkhouser et al., U.S. Pat. No. 2,877,872 to Krizan and U.S. Pat. No. 3,507,366 to King. Each of these patents shows a relatively complicated approach to providing a shock absorber with a valve or set of valves, conduits and chambers, which is reactive to changes in inertia or centrifugal force, which in turn varies the damping characteristics of the shock absorber to stop the undesirable body movement. None of these teachings provides a means to correct the vehicle body position after the movement has been controlled, i.e., a means to return the vehicle body to a more level position and to overcorrect to more optimally align the vehicle body during turning, stopping or accelerating while the vehicle is still subject to the centrifugal or inertial forces. Bock et al. in U.S. Pat. No. 5,383,680 shows an anti-roll system utilizing bypass conduits and one-way valves which provides for only uni-directional piston travel under certain conditions, but which fails to provide limiting means for excessive travel and corrective action, and makes no claim of overcorrecting the vehicle.

It is an object of this invention to provide a self-correcting shock absorber or shock absorber system of relatively simple construction which limits undesirable vehicle body movement resulting from inertial and centrifugal effects during turning, accelerating and stopping, either completely or in a restricted manner, while simultaneously correcting the vehicle body position while the vehicle is still subject to the inertial and centrifugal effects. It is a further object to provide such a system wherein the limitation of undesirable vehicle body movement is controlled by providing a means to sense the change in centrifugal force which in turn blocks or restricts normally open flow apertures within the shock absorber cylinder to prevent flow of damping fluid in the reactive direction. It is a further object to provide such a system wherein the correction of vehicle body position is accomplished by providing one way check or pressure relief type valves, whereby relatively small variations in the road surface cause damping fluid to flow in the opposite or non-reactive direction to move the piston, and thereby the vehicle body, in the desired direction to level out the body position and to overcorrect body position for optimum alignment during turning, stopping or accelerating. It is a further object to provide piston travel limiting means, such that the corrective action is precluded when the piston travels to either end of the cylinder and which allows the shock absorber to function in the normal mode to damp road shocks.

SUMMARY OF THE INVENTION

The invention comprises in general a shock absorber having a sealed cylinder containing a damping fluid or oil, a rod extending through one end of the cylinder, to which is attached a piston which divides the cylinder interior into an upper chamber and a lower chamber, and conduit means to allow the damping fluid to pass between the upper chamber and the lower chamber, where the piston and rod are free to reciprocate within the cylinder. The shock absorber is mounted in conventional manner to a motor vehicle between the chassis or body and the axle so as to dampen sudden movements of the vehicle wheel caused by bumps or depressions in the roadway.

The invention further comprises means to sense changes in vehicle inertia, such as turning, accelerating or stopping, which may comprise means to sense changes in centrifugal force or means to directly monitor steering, braking or accelerating components of the vehicle. The inertia sensing means operatively communicates with means to block or restrict flow of damping fluid in the reactive direction from the high pressure or contracting chamber in the cylinder to the low pressure or expanding chamber, whereby the flow is stopped or severely restricted in response to a change in inertia. The invention further comprises means to deliver damping fluid in the corrective direction opposite to the reactive direction, i.e., from the expanding chamber to the contracting chamber.

When a change in inertia or centrifugal force is sensed, the fluid flow restricting means blocks the flow of damping fluid through the conduit means, typically a flow orifice in the piston, which prevents the piston from moving relative to the cylinder, thus preventing movement of the vehicle body in the direction resulting from centrifugal effects. The shock absorber is thus transformed into a fixed rod, if flow is completely blocked, or a very stiff shock absorber, if some flow is allowed to continue in the reactive direction from the contracting chamber to the expanding chamber. At the same time, relatively small variations in the road surface apply pressure to the shock absorber in the direction opposite to the pressure from the centrifugal forces, which causes damping fluid to flow through the one way valves in the corrective direction, thus in effect pumping fluid from the expanding chamber into the contracting chamber. This forced fluid flow causes the piston to move in the direction opposite to the direction of imposed force from the centrifugal effects, thereby leveling the vehicle body and, if the centrifugal effects continue long enough, actually over-correcting the vehicle body to cause it to lean or bank into a turn, to lower the nose and raise the rear during acceleration, or to raise the nose and lower the rear during braking.

The invention further comprises piston travel limiting means to limit travel of the piston in either corrective direction to prevent the piston from contacting the ends of the cylinder due to the corrective movement and to allow the piston to move in either direction in response to road conditions. The travel limiting means comprise at least a pair of flow paths for the damping fluid, one adjacent each end of the cylinder, which extend in the axial direction a distance greater than the height of the piston and open into the interior of the cylinder. Each flow path has two openings which communicate with the interior of the cylinder. When the piston is positioned between the two openings of a flow path, damping fluid will bypass the piston so that corrective action is canceled, returning the shock absorber to a normal operational mode whereby the piston will respond to bumps and depressions with motion in the appropriate direction.

BRIEF DESCRIPTION OF THE DRAWINGS

FIGS. 2a and 2b show a pair of shock absorbers in a left turn situation.

FIGS. 3a and 3b show a pair of shock absorbers in a right turn situation.

DETAILED DESCRIPTION OF THE INVENTION

Figure 1:
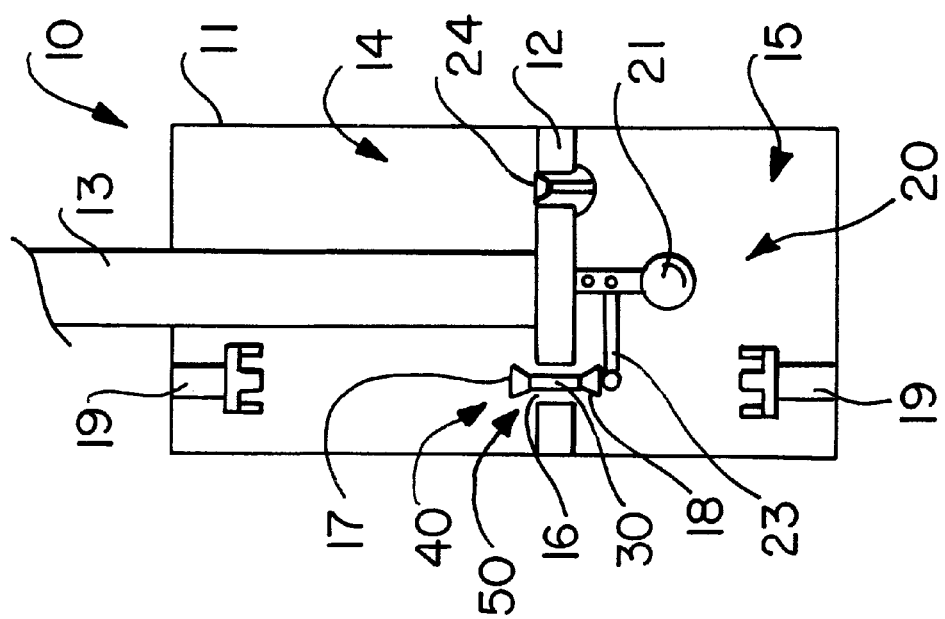
FIG. 1 is a representational or schematic view of the invention in a non-reactive situation, showing some components as exposed.

With reference to the drawings, the invention will now be described in detail with regard to the best mode and preferred embodiments. The drawings are representational or schematic in nature. As seen in FIG. 1, in general the invention is a self-correcting shock absorber device or system 10 for a motor vehicle, comprising a sealed cylinder 11 having a rod 13 passing through one end thereof, a piston 12 connected to the interior end of the rod 13, the outer configuration of the piston 12 matching the interior configuration of the cylinder 11, where the piston 12 divides the interior of the cylinder 11 into an upper chamber 14 and a lower chamber 15. The cylinder 11 is filled with a damping fluid (not shown), such as oil, gas or the like, which passes through damping fluid conduit means 50, in this case flow orifice 16 in piston 12. Such a construction for a shock absorber 10 is well known in the art. As drawn, the lower end of the cylinder 11 would be connected in known manner to the axle of the vehicle and the external end of the rod 13 would be attached to the vehicle chassis or body. When the vehicle wheel encounters a bump in the road surface, the shock absorber 10 is compressed such that the cylinder 11 is forced upward. The relative movement of the piston 12 within the cylinder 11 presses against the damping fluid in the lower chamber 15, causing damping fluid to flow through flow orifice 16 into the upper chamber 14, which expands in size while lower chamber 15 contracts or diminishes in size. The relatively small volume of damping fluid passing through flow orifice 16 dampens the movement of piston 12 and rod 13 relative to the cylinder 11, thereby absorbing the energy from the bump such that less of the energy is transferred to the vehicle body, which remains relatively stable instead of bouncing upward. When the vehicle wheel encounters a depression or hole in the road surface, the shock absorber 10 is extended such that the cylinder 11 is pulled downward. The relative movement of the piston 12 within the cylinder 11 presses against the damping fluid in the upper chamber 14, causing it to contract and damping fluid to flow through flow orifice 16 into lower chamber 15, which expands in size. The shock absorber 10 dampens the relative movement of piston 12 and cylinder 11, thereby maintaining the vehicle body in a relatively stable position instead of dropping downward.

The invention improves on the typical shock absorber construction by providing inertia or centrifugal force sensing means 20 operatively connected to means 30 to block damping fluid flow in the reactive direction, and further by providing means 40 to deliver damping fluid or to allow fluid flow in the corrective direction. As used herein, the reactive flow direction means the normal direction of damping fluid flow from the contracting chamber of the cylinder 11 into the expanding chamber responsive to a change in inertia, such as encountered in turning, accelerating or stopping. For example, in a turn centrifugal forces are created which force the vehicle body downward relative to the wheels or road surface on the side away from the turn direction, compressing the shock absorbers 10 on that side, such that the upper chamber 14 is expanding and the lower chamber 15 is contracting. At the same time, centrifugal forces drive the vehicle body upward on the side in the turn direction, extending the shock absorbers 10 on that side, such that the upper chamber 14 is contracting and the lower chamber 15 is expanding. In a left hand turn, the left side shock absorbers 10 are extended and the right side shock absorbers 10 are compressed, as shown in FIG. 2. In a right hand turn, the left side shock absorbers 10 are compressed and the right side shock absorbers 10 are extended, as shown in FIG. 3. In rapid acceleration, inertial forces cause the nose of the vehicle to rise and the rear of the vehicle to dip or squat, such that the forward shock absorbers 10 are extended and the rear shock absorbers 10 are compressed. In hard braking, the inertial forces cause the nose of the vehicle to dip and the rear to rise, such that the forward shock absorbers 10 are compressed and the rear are extended. When the centrifugal or inertial forces compress the shock absorber 10, the fluid in the lower chamber 15 of the cylinder 11 is placed under high pressure and the fluid in the upper chamber 14 is placed under low pressure, such that the reactive direction of flow is from the lower contracting chamber 15 into the upper expanding chamber 14. When the centrifugal or inertial forces extend the shock absorber 10, the fluid in the upper chamber 14 is placed under high pressure and the fluid in the lower chamber 15 is placed under low pressure, and the reactive direction of flow is from the upper contracting chamber 14 to the lower expanding chamber 15. The corrective direction as used herein shall mean the direction opposite to the reactive direction, i.e., corrective flow means transfer of damping fluid from the chamber of cylinder 11 expanding under centrifugal or inertial force effects into the chamber contracting under the force effects. Flow in the corrective direction is against the normal inertial or centrifugal force effects acting on the piston 12 and cylinder 11. Where the inertial or centrifugal forces seek to compress the shock absorber 10, fluid flow in the corrective direction extends the shock absorber 10. Where the inertial or centrifugal forces seek to extend the shock absorber 10, fluid flow in the corrective direction compresses the shock absorber 10.

Figure 4:
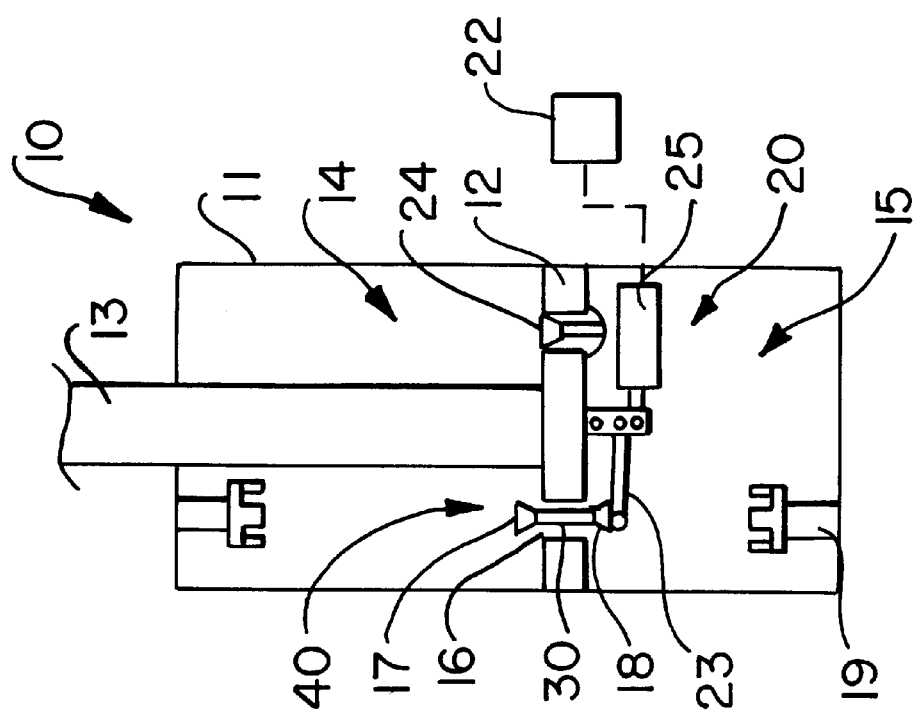
FIG. 4 is an alternative construction for the invention, showing the use of electronic inertial sensing means.

The means 30 to restrict flow in the reactive direction comprises an operable valve which blocks flow of the damping fluid through the flow orifice 16. The flow restriction means 30 may completely seal the flow orifice 16 to prevent passage of any damping fluid, in effect transforming the shock absorber 10 into a fixed rod, or may allow a relatively small amount of flow such that greatly reduced relative movement of piston 12 and cylinder 11 is still possible. The flow restrictive means 30 is operated by or responsive to the inertial sensing means 20. Inertia sensing means 20 may comprise any suitable mechanism for detecting the inertial change in the vehicle, such as turning, acceleration or deceleration from braking, the centrifugal force from turning the vehicle, or may actually directly monitor the movement of the steering, accelerating or braking components of the vehicle itself, e.g., monitoring the turning of the steering wheel. In FIG. 1, the inertial sensing means 20 is shown as comprising a pendulum weight or mass 21 pivotally suspended such that a change in vehicle inertia or direction alters the position of the weight 21. The weight 21 is connected by a connecting structure 23 to the flow restrictive means 30, which in the embodiment shown is a double headed valve which reciprocates within the flow orifice 16. As shown in FIG. 4, the inertia sensing means 20 may also comprise a remote electronic device 22 incorporating an attitude sensing member which translates changes in inertia into signals which operate a solenoid, motor, switch or the like 25 to alter the position of the flow restrictive means 30 relative to the flow orifice 16.

Movement of the pendulum weight 21 causes the flow restrictive means 30 to block the flow orifice 16 when the centrifugal forces are high enough, thus preventing flow of damping fluid in the reactive direction. Minor turns at low speeds will not move the pendulum far enough to block flow orifice 16. As seen in FIGS. 2 and 3, which demonstrate the effects in turning to the left and to the right, respectively, when the centrifugal force is sufficient to cause the pendulum weight 21 to swing in a direction away from the flow orifice 16, as seen in FIGS. 2a and 3b, the flow restrictive means 30 is pulled downward to block the flow orifice 16, preventing or severely restricting flow of damping fluid from the contracting upper chamber 14 to the expanding lower chamber 15. When the centrifugal force causes the pendulum weight 21 to swing in a direction toward the flow orifice 16, as seen in FIGS. 2b and 3a, the flow restrictive means 30 is pushed upward to block the flow orifice 16, in this circumstance preventing or severely restricting flow from the contracting lower chamber 15 to the expanding upper chamber 14. Thus when the vehicle is turned to the left, as in FIG. 2, or to the right, as in FIG. 3, the inertia sensing means 20 cause the flow orifices 16 to be blocked, which prevents the away side of the vehicle from lowering any further and the near side of the vehicle from raising any higher. The inertia sensing means 20 and connecting structure 23 may be encased inside the piston 12 itself or in a separate housing, not shown.

The shock absorber is also provided with means 40 to deliver or allow flow of damping fluid in the corrective direction from the expanding side of the cylinder 10 to the contracting side. Corrective delivery means 40 is preferably at least a pair of one way check or pressure relief valves which only allow flow in the corrective direction, and the elements may simultaneously comprise both the corrective delivery means 40 as well as the flow restrictive means 30. As shown in FIG. 1, the corrective delivery means 40 preferably comprises an upper one way check valve 17 which forms the upper end of the flow restrictive valve 30 and a lower one way check valve 18 which forms the lower end of the flow restrictive valve 30. When the upper chamber 14 is the contracting chamber and the upper end of flow restrictive valve 30 is seated in the flow orifice 16 to block flow into the lower chamber, thereby preventing the shock absorber 10 from expanding, as in FIGS. 2a and 3b, the upper check valve 17 allows damping fluid to be driven from the lower chamber 15 into the upper chamber 14. When the lower chamber 15 is the contracting chamber and the lower end of flow restrictive valve 30 is seated in flow orifice 16 to prevent the shock 10 from contracting, as in FIGS. 2b and 3a, the lower check valve 18 allows damping fluid to be driven from the upper chamber 14 into the lower chamber 15.

The damping fluid is driven in the corrective direction against the force effects of the inertial or centrifugal forces due to relatively small changes in the smoothness of the road surface and to bouncing movement of the body on the suspension. Once the shock absorber 10 is effectively locked into position by the flow restrictive valve 30 being seated in the flow orifice 16 during a turn, effectively halting the tendency of the vehicle to lean out of the turn, the shock absorber 10 will be subject to a large number of small forces which would tend to either compress or expand a free shock absorber 10. When the road surface effects would act on the shock absorber 10 in the same manner as the inertial effects, i.e., seeking to compress a shock absorber 10 being compressed by the inertial effects or seeking to expand a shock absorber 10 being expanded by the inertial effects, the flow restrictive valve 30 prevents relative movement of piston 12 and cylinder 11. When the road surface effects would act on the shock absorber 10 in the opposite manner to the inertial effects, i.e., seeking to expand a shock absorber 10 being compressed by the inertial effects or seeking to compress a shock absorber 10 being expanded by the inertial effects, the corrective delivery means 40 allows the damping fluid to be forced through the flow orifice 16 in the corrective direction.

For example, in FIG. 2a small bumps in the road surface will provide an opposing force greater than the centrifugal force and will drive fluid through upper check valve 17 from the lower chamber 15 of the left side shock absorber 10 into the upper chamber 14, thereby contracting shock absorber 10 and lowering the left side of the vehicle body. Small depressions which would normally expand shock absorber 10 will have no effect on the left side shock absorber 10, since flow from the upper chamber 14 into the lower chamber 15 is blocked by the flow restrictive valve 30. Simultaneously, as seen in FIG. 2b, small depressions in the road surface will drive fluid through lower check valve 18 from the upper chamber 14 of the right side shock absorber 10 into the lower chamber 15, thereby expanding the shock absorber 10 and raising the right side of the vehicle body. Small bumps will have no effect on the body position of the vehicle, as flow from the lower chamber 15 to the upper chamber 14 is blocked. The opposite occurs when the vehicle is in a right hand turn, as shown in FIG. 3. The corrective delivery means 40 will continue to correct the attitude of the vehicle body as long as the vehicle remains in the turn, and will overcorrect the attitude past horizontal such that the vehicle body will be made to lean or bank into the turn, greatly increasing handling characteristics.

If the vehicle remains in the turn for an extended period, travel limiting means 19 must be provided to prevent the piston 12 from being driven too far in either direction by the corrective delivery means 40. As seen in FIG. 1, travel limiting means 19 may comprise a spring member which opens the restrictive flow valve 30 when the piston 12 nears its full range of travel. This enables damping fluid to again flow through the flow orifice 16 in the reactive direction from the contracting chamber of the cylinder 11 to the expanding chamber in response to the effects of inertial or centrifugal force, thereby counteracting the effect of the corrective delivery means 40. Travel limiting means 19 are designed such that restrictive flow valve 30 remains in the neutral open position and is not completely closed off, thus allowing the shock absorber 10 to operate in the normal manner in either the extreme extended or extreme compressed position.

Preferably a one-way pressure relief valve 24 enabling flow under high pressure conditions above a predetermined limit from the lower chamber 15 to the upper chamber 14 is provided in piston 12, which overrides the expanding corrective operation in the shock absorber 10, such that the shock absorber 10 will be able to absorb the compressive force of large bumps. In the expanding corrective operation, damping fluid flow is not permitted from the lower chamber 15 to the upper chamber 14. To absorb the force of a large bump, pressure relief valve 24 opens above a certain force threshold to allow damping fluid to flow into the upper chamber 14, thereby overriding seated restrictive flow valve 30.

When the vehicle direction of travel is straightened out, the inertia sensing means 20 returns to the passive position of FIG. 1 and the flow restrictive valve 30 no longer blocks the flow orifice 16. The shock absorber 10 now acts in the normal manner to absorb road bumps and depressions, with the damping fluid passing freely through the piston 12 in the necessary direction to damp its movement.

Figure 5:
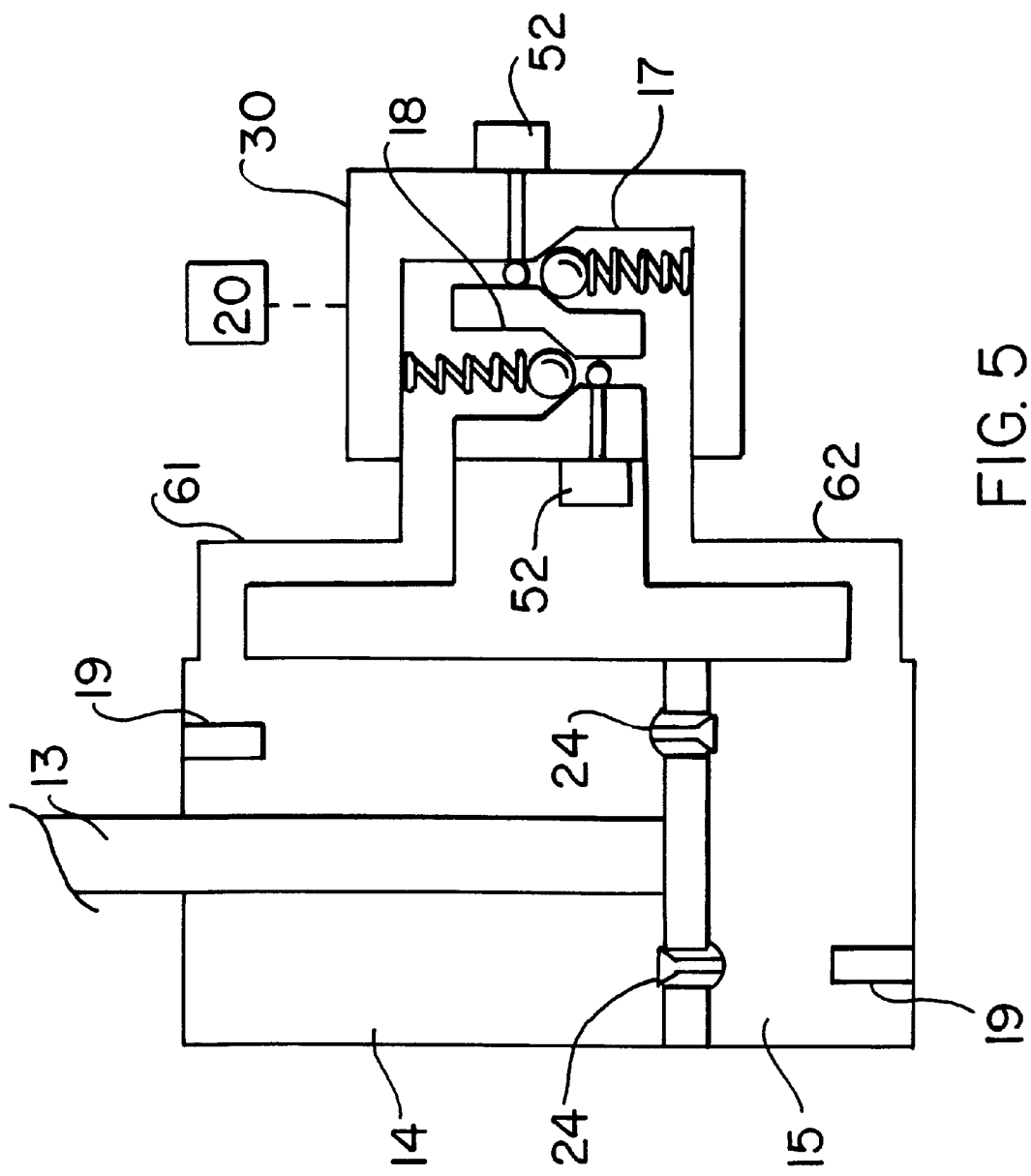
FIG. 5 is an alternative embodiment for the invention, showing an external conduit for transfer of the damping fluid.

An alternative embodiment for the invention is shown in FIG. 5, where damping fluid conduit means 50 is provided to allow passage of damping fluid between the upper chamber 14 and lower chamber 15 of the cylinder 11 without passing through piston 12 in normal conditions. Damping fluid conduit means 50 is a conduit 51 external to the two chambers 14 and 15. The inertia sensing means 20 is shown schematically, and may comprise the pendulum weight mechanism 21, an electronic sensing mechanism 22 or any other suitable inertial or attitudinal monitoring device, coupled with flow restrictive valve 30 positioned within external conduit 51. Flow restrictive valve 30 may comprise an upper one-way check valve 17 and a lower one-way check valve 18 which are normally open but may be closed by solenoid valves 52 in response to a signal from centrifugal force sensing means 20. In the open configuration, damping fluid is able to flow in either direction and the shock absorber 10 acts in the normal manner. In a turning situation, either check valve 17 or 18 is closed by its associated solenoid valve 52. If upper check valve 17 is closed, then only corrective flow is allowed from the lower chamber 15 into upper chamber 14 through valve 18. If lower check valve 18 is closed, then only corrective flow is allowed from upper chamber 14 through valve 17 into lower chamber 15. Pressure relief valves 24 are positioned in piston 12, and comprise a one-way valve 24 which allows flow only from the lower chamber 15 to the upper chamber 14, and another one-way valve 24 which allows flow only from the upper chamber 14 to the lower chamber 15. Traveling limiting release members 19 open the pressure relief valves 24 if the piston 12 travels beyond a predetermined limit within the cylinder 11. Likewise, if in the expanding corrective operation a large bump is encountered, damping fluid will be allowed to pass from the lower chamber 15 to the upper chamber 14 through one of the pressure relief valves 24, the particular valve 24 being designed to open at a certain pressure threshold.

Figure 8:
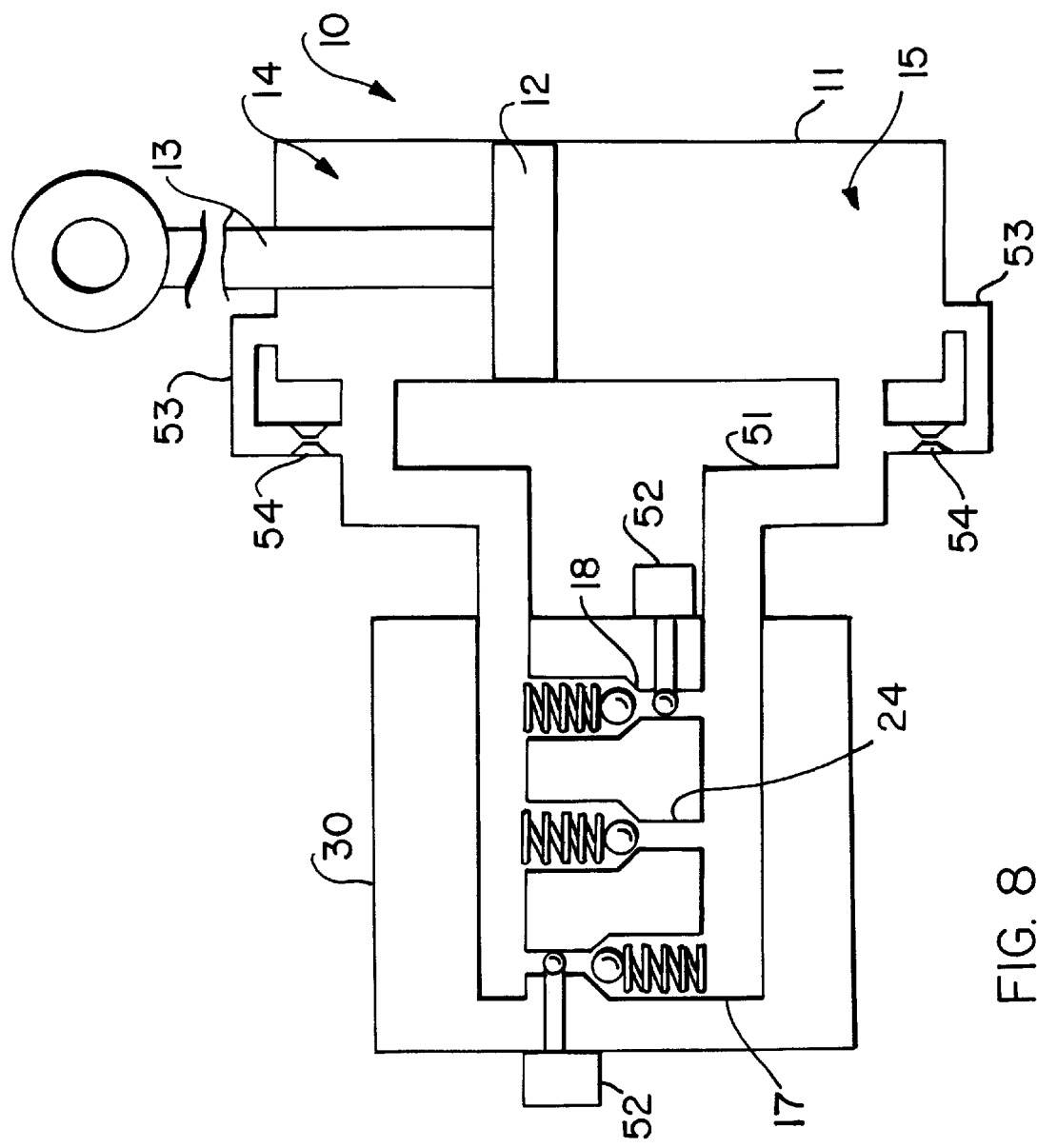
FIG. 8 shows an alternative embodiment for the flow restrictive means external to the shock absorber cylinder.

In another alternative embodiment having an external flow conduit 50, shown in FIG. 8, the piston-mounted pressure relief valves 24 are replaced by a single, externally mounted pressure relief valve 24. As before, the external flow conduits 51 allow fluid flow reactive flow restrictive means 30 under straight ahead or low speed turning. Solenoid valves 52 are normally open unless closed by centrifugal force sensing means 20, not shown, in response to excessive centrifugal force. In the open configuration the fluid is free to flow either through upper check valve 17 or lower check valve 18. In a turning situation, either solenoid valve 52 closes off flow through check valve 17, in which case only corrective flow is allowed from lower chamber 15 into upper chamber 14, or the other solenoid valve 52 closes off flow through check valve 18, in which case only corrective flow is allowed from upper chamber 14 into lower chamber 15. If a severe compressive force is encountered, pressure relief valve 24 will be forced open and damping fluid will be allowed to travel into the upper chamber 14. To prevent bottoming-out of the shock absorber 10 either in the fully extended or fully compressed position, each end of conduit 51 is provided with a branch conduit 53. The conduit 51 enters the cylinder 11 a short distance from either end, such that piston 12 may pass beyond it. The branch conduits 53 enter the cylinder 11 on the end or adjacent the end, and may contain a restrictive flow orifice 54, always open, of the type typically found in conventional shock absorbers. When the piston 12 travels to the far extent of the cylinder 11, either in upper chamber 14 or lower chamber 15, it passes the main conduit 51 and occupies a position between conduit 51 and the branch conduit 53. In this position the shock absorber 10 functions in the normal manner, in that the piston 12 is free to travel in any direction to absorb minor variations, flow of damping fluid being in either direction through the restrictive flow orifice 54.

Figure 9:
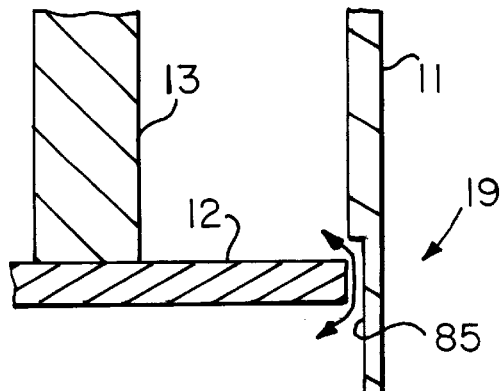
FIG. 9 shows a partial cross-sectional view of an alternative embodiment for the piston travel limiting means comprising a groove in the interior wall of the cylinder.
Figure 10:
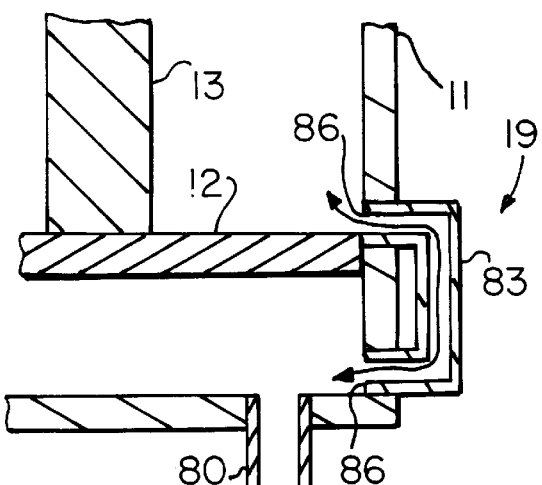
FIG. 10 shows a partial cross-sectional view of another alternative embodiment for the piston travel limiting means comprising an external conduit.
Figure 11:
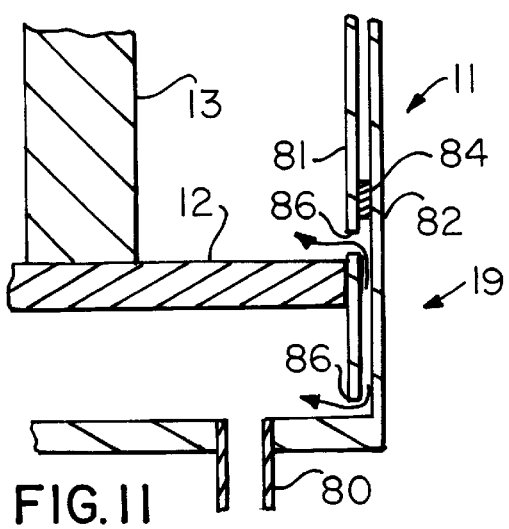
FIG. 11 shows a partial cross-sectional view of another alternative embodiment for the piston travel limiting means comprising a cylinder formed with an inner and outer wall.

Alternative embodiments for the piston travel limiting means 19 are shown in FIGS. 9, 10 and 11, these embodiments being more universally adaptable to different constructions for the shock absorber. Although illustrated in all three drawings with an external bypass conduit 80 which would conduct damping fluid similar to the conduits 61 and 62 in FIGS. 5 and 6 and similar to conduit 51 in FIG. 8, it is to be understood that the travel limiting means 19 illustrated could also be used with constructions as illustrated in FIGS. 1 and 4 where valves are positioned in the piston 12 itself. As shown in FIG. 9, travel limiting means 19 comprises one or more grooves 85 cut generally in the axial direction into the interior wall of cylinder 11 near or adjacent the end of the upper chamber 14 and the lower chamber 15, where the length of the groove 85 is greater than the height of the piston 12. As the piston 12 approaches the end of the cylinder 11 due to the corrective action of the system, the piston 12 moves past the beginning first end or opening of the groove 85 such that a pathway for the damping fluid around the piston 12 becomes operational. As damping fluid is delivered against the piston 12, it flows around piston 12 through the second end or opening of groove 85 instead of forcing the piston 12 in the corrective direction, thus preventing the piston 12 from being driven to the end of the cylinder 11. The groove 85 is sized to allow for the proper volume flow of damping fluid needed to halt corrective movement of the piston 12, and multiple grooves 85 may be provided. A similar groove or grooves 85 with first and second ends or openings will be positioned at the opposite end of the cylinder 11 to arrest corrective movement in this direction. Multiple grooves 85 at one or both ends of the cylinder may vary in length, width and depth. This construction also allows the shock absorber 10 to react to bumps in the roadway in a normal manner when in either the extended or contracted position, since the piston 12 is free to travel in either direction because of the alternative flow path provided around the piston. Should the piston 12 move too far in the direction opposite to the corrective direction, the travel limiting means 19 will be closed off and piston travel will again be limited to the corrective direction as explained above.

FIG. 10 shows an embodiment where the travel limiting means 19 comprises a distinct tube or conduit 83 which is connected through the cylinder wall 11. The openings 86 into the interior of the cylinder 11 are spaced a distance greater than the height of the piston 12 such that the damping fluid will flow around the piston 12, and the travel limiting means 19 will function in the same manner as explained relative to FIG. 9. FIG. 11 shows still another embodiment, where the cylinder 11 is formed with an interior wall 81 and an exterior wall 82 separated to define a flow path through the damping fluid can flow when the openings 86 are both exposed. A sealing member 84 prevents flow of damping fluid into the opposite end of the cylinder 11.

Figure 6:
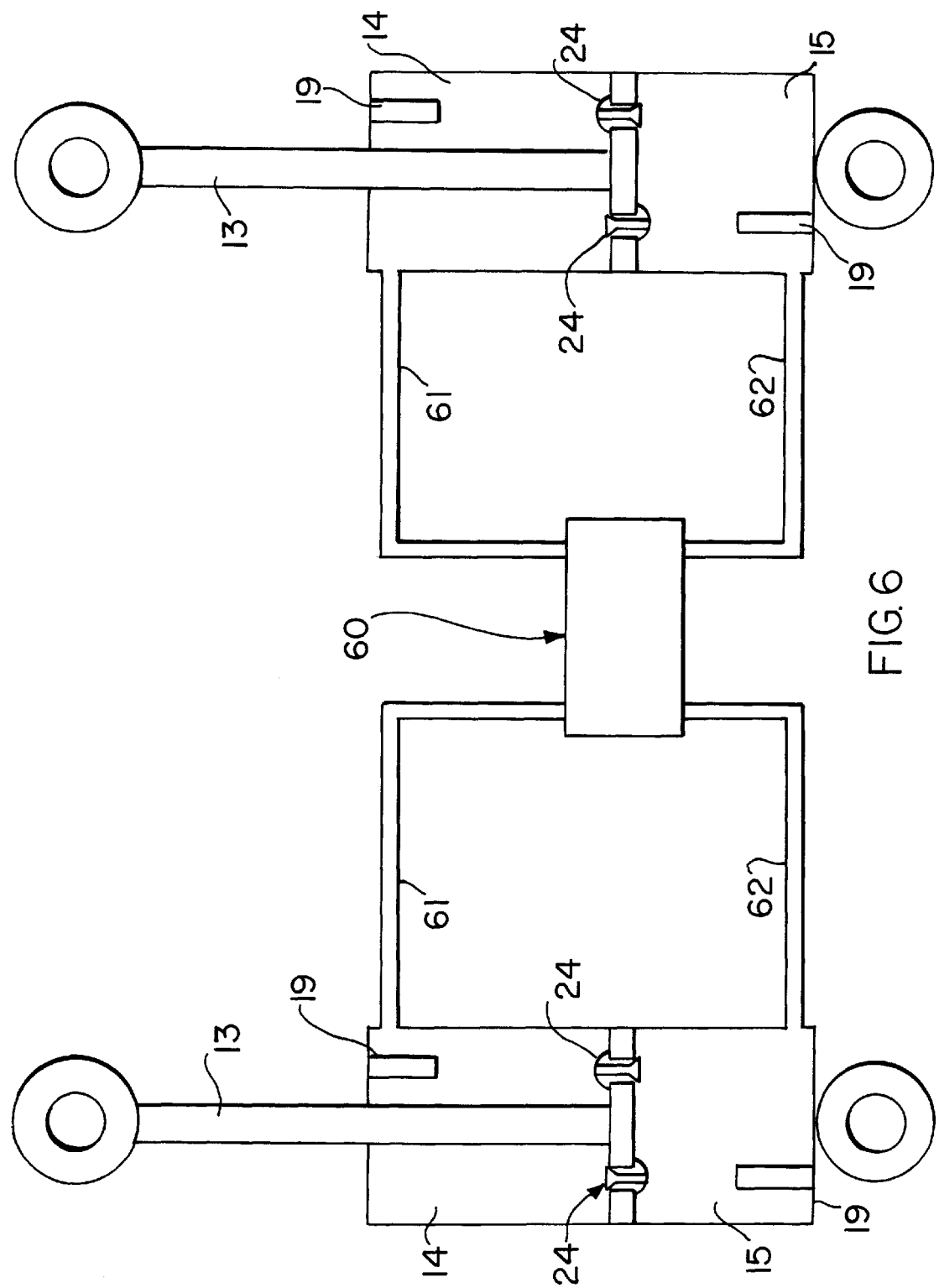
FIG. 6 is an alternative embodiment, showing passage of damping fluid through a central controller unit.

Another embodiment is shown in FIGS. 6 and 7, in which the damping fluid passes through a central controller unit 60.

Figure 7A:
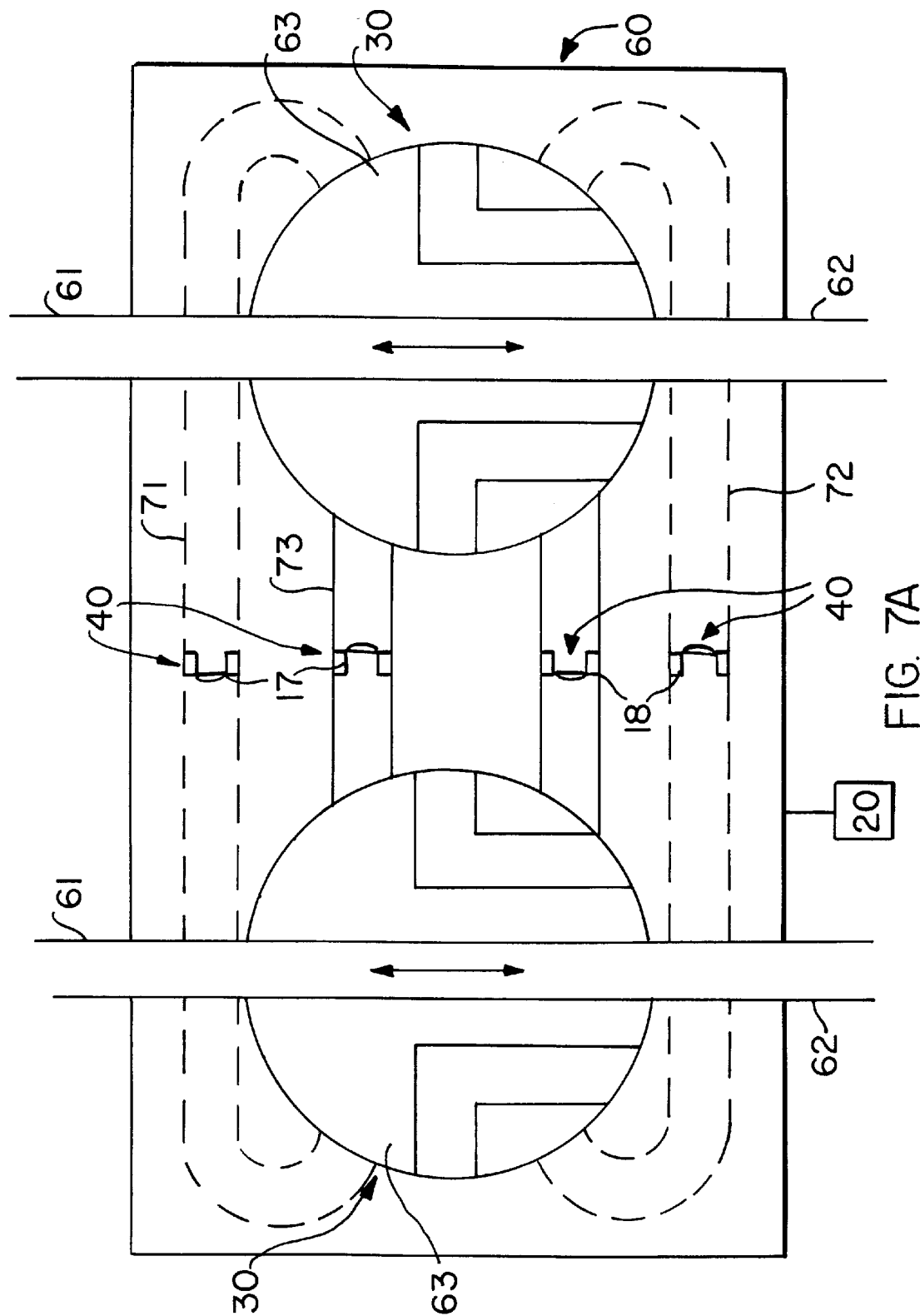
FIGS. 7a through 7c show an alternative embodiment where fluid is transferred between shocks.
Figure 7B:
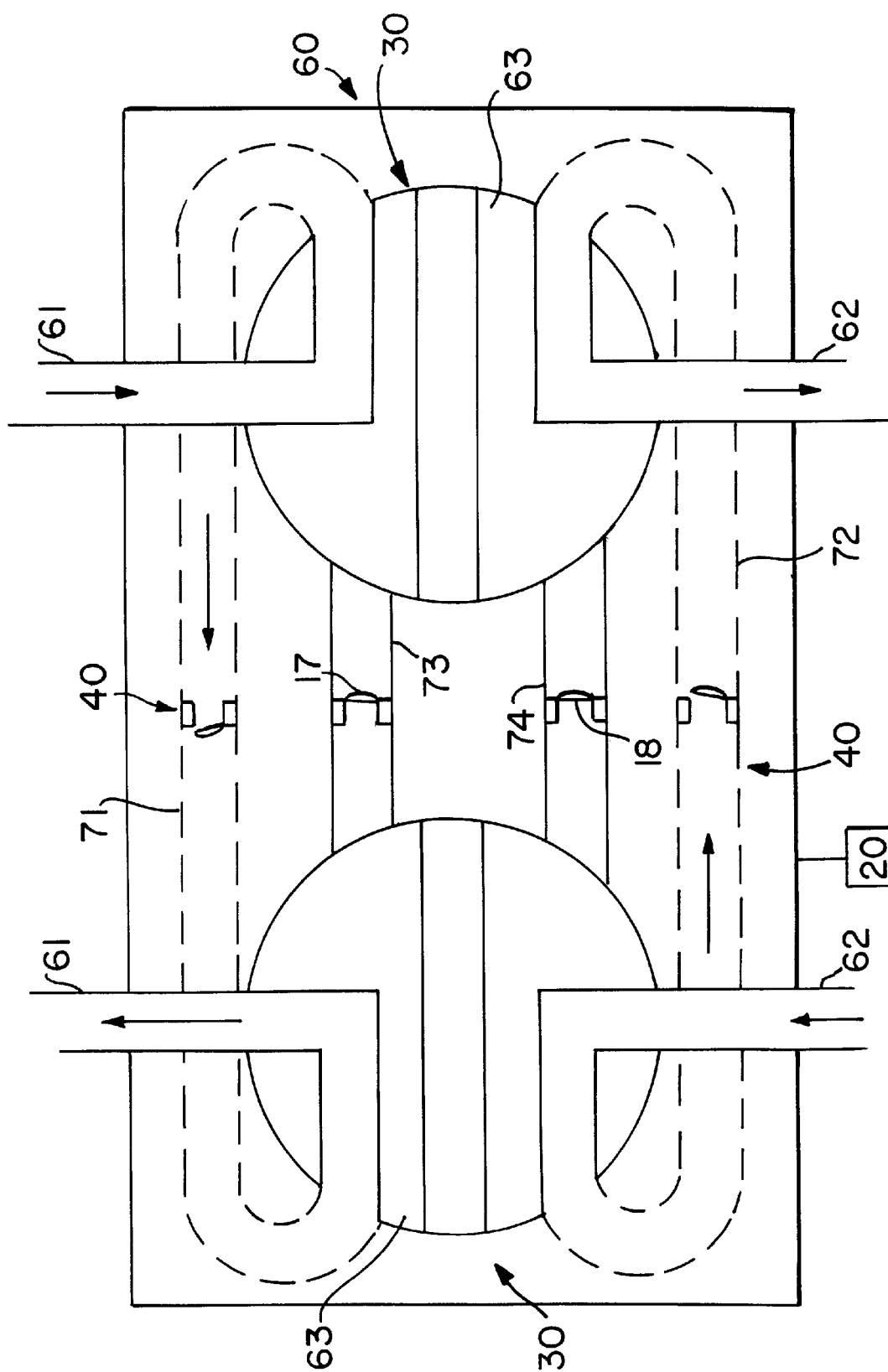
Figure 7C:
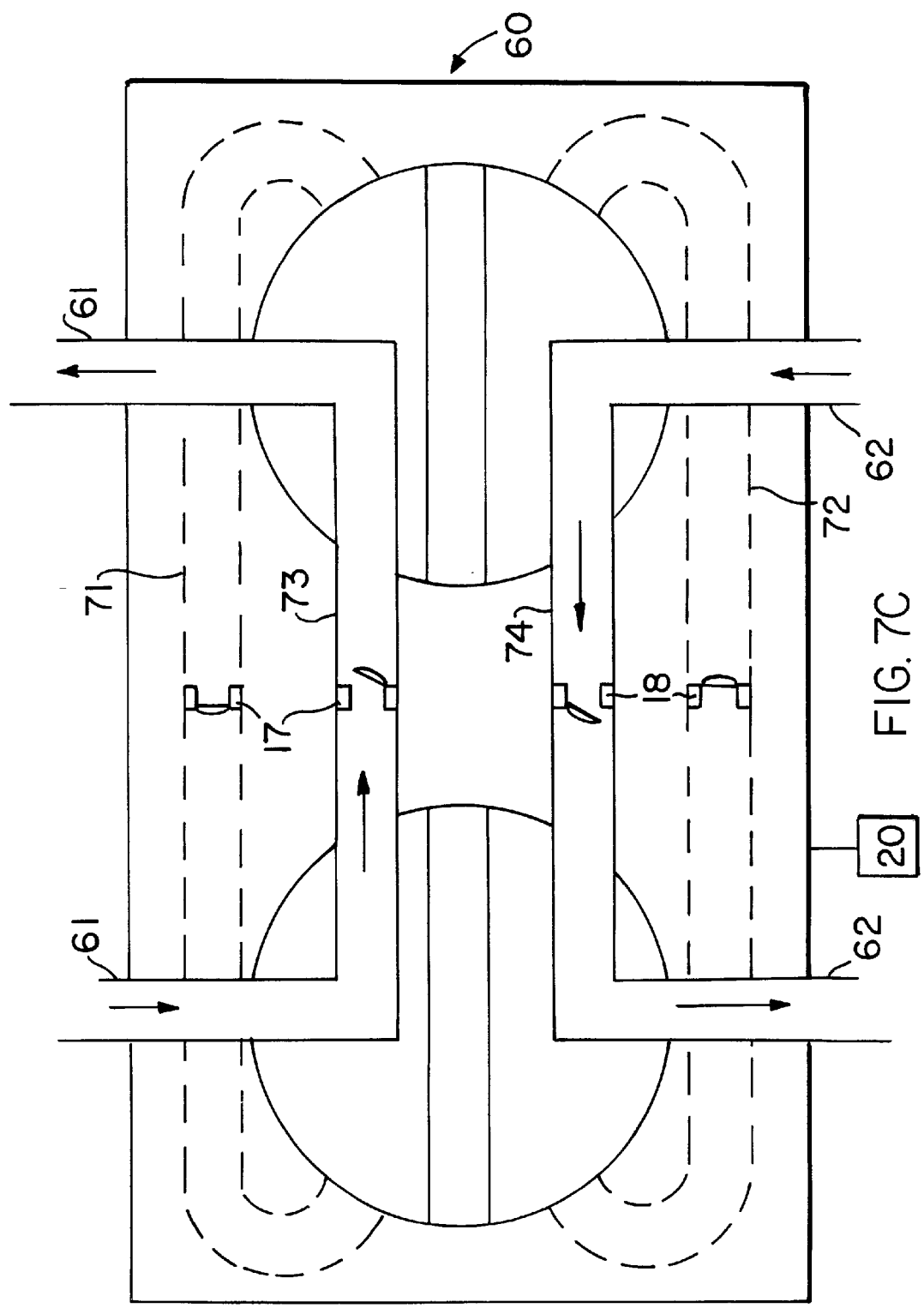

The central controller unit 60 is connected to opposing shock absorbers 10 by upper chamber conduits 61 and lower chamber conduits 62. The shock absorbers 10 each contain pressure relief valves 24. The central controller unit 60 controls the flow of damping fluid by positioning valve means, shown as a pair of three-position reactive flow directing valves 63, which comprise the flow restricting means 30. The valves 63 are controlled by inertia sensing means 20. Under routine straight ahead or low speed cornering driving conditions, the valves 63 are positioned as shown in FIG. 7a, such that damping fluid flows in either direction through conduits 61 and 62 between the upper chamber 14 and the lower chamber 15 of each shock 10. In response to left turn centrifugal force, the sensing means 20 rotates the valves 63 to the position shown in FIG. 7b. In this position fluid is transferred from one shock 10 to the other shock 10 through corrective flow delivery means 40, which comprise check valves 17 and 18 mounted in internal conduits 71 and 72. In the left turn, the far or right side shock 10 is compressed by centrifugal force and the near or left side shock 10 is extended. Rotation of valves 63 prevents flow of fluid from the contracting chambers of each shock 10 into the expanding chambers. Corrective fluid flow is allowed from the right side upper chamber 14 through conduit 61, valve 63, internal conduit 71, upper check valve 17, the other valve 63 and the other conduit 61 into the upper chamber 14 of the left side shock 10, thus correctively compressing the left side shock 10 while correctively extending the right side shock 10. Simultaneously, corrective fluid flow is allowed from the left side lower chamber 15 through conduit 62, valve 63, internal conduit 72, lower check valve 18, the other valve 63 and the other conduit 62 into the lower chamber 15 of the right side shock. In a right hand turn, as shown in FIG. 7c, the valves 63 are rotated so that corrective flow occurs from the upper chamber 14 of the far or left side shock 10 through conduit 61, valve 63, internal conduit 73, upper check valve 17, the other valve 63 and the other conduit 61 into the upper chamber 14 of the near or right side shock 10, thus correctively compressing the right side shock 10 and correctively expanding the left side shock 10. Simultaneously, damping fluid flows from the right side lower chamber 15 through conduit 62, valve 63, internal conduit 74, lower check valve 18, the other valve 63 and the other conduit 62 into the left side lower chamber 14.

In the above examples, the force has usually been discussed as centrifugal force from a turn. It is readily seen that operation in response to acceleration or braking inertial forces would be in the same manner, the sensing means 20 reacting to inertial changes in the front to rear direction rather than the side to side direction. A sensing means 20 capable of sensing force effects in 360 degrees could be used to operate the restrictive and corrective means 30 and 40 in all four force conditions—left turn, right turn, acceleration and braking.

It is contemplated that equivalents or substitutions of certain elements or components set forth above may be obvious to those skilled in the art without departing from the function and spirit of the invention. The true scope and definition of the invention therefore is to be as set forth in the following claims.

I claim:

1. In a shock absorber for a wheeled vehicle, the shock absorber comprising a cylinder containing a reciprocating rod and piston, the piston dividing the cylinder into an upper chamber and a lower chamber each containing a damping fluid and each of which expands and contracts in response to movement of the piston and a change in inertia resulting from turning, accelerating or stopping, with a flow orifice connecting the upper chamber to the lower chamber to allow transfer of damping fluid therebetween, the shock absorber further comprising:

(A) inertia sensing means to sense a change in inertia resulting from turning, accelerating or stopping;

(B) damping fluid blocking means operatively connected to said inertia sensing means, said damping fluid blocking means restricting flow of damping fluid through the flow orifice between the upper chamber and the lower chamber in the reactive flow direction when said inertia sensing means senses a change in inertia of predetermined amount, where the reactive flow direction is the normal direction of flow from the one of the upper and lower chambers which is contracting to the other of the upper and lower chambers which is expanding in response to a particular change in inertia;

(C) damping fluid delivery means communicating between said upper and lower chambers and allowing flow of damping fluid between the upper chamber and the lower chamber only in the corrective flow direction when said damping fluid blocking means has restricted flow, where the corrective flow direction is the direction opposite to the reactive direction and is flow from said upper chamber to said lower chamber when said upper chamber is expanding and from said lower chamber to said upper chamber when said lower chamber is expanding; and (D) travel limiting means positioned near the end of said upper chamber and near the end of said lower chamber of said cylinder, each said travel limiting means providing a passageway for flow of damping fluid around said piston in either direction between said upper chamber and said lower chamber, whereby when said piston is positioned adjacent said travel limiting means said piston is able to move normally in either direction in response to road conditions.

2. The device of claim 1, where said damping fluid delivery means comprises an upper one way valve and a lower one way valve positionable in the flow aperture, said upper one way valve allowing flow from the lower chamber to the upper chamber when said damping fluid blocking means is restricting flow of damping fluid from the upper chamber to the lower chamber, and said lower one way valve allowing flow from the upper chamber to the lower chamber when said damping fluid blocking means is restricting flow from lower chamber to the upper chamber.

3. The device of claim 1, where said inertia sensing means comprises a pendulum weight.

4. The device of claim 1, where said inertia sensing means comprises an electronic sensor.

5. The device of claim 1, where the travel limiting means opens said damping fluid blocking means to allow flow of damping fluid through the flow orifice between the upper chamber and the lower chamber in the reactive flow direction when said piston reaches a predetermined limit of travel.

6. The device of claim 1, further comprising a one way pressure relief valve mounted in the piston, the one way pressure relief valve allowing flow from the lower chamber to the upper chamber under high pressure conditions above a predetermined limit.

7. The device of claim 1, where the flow orifice is a conduit external to the cylinder, and where said damping fluid blocking means and said damping fluid delivery means communicate with said conduit, said damping fluid delivery means comprising an upper one way check valve and a lower one way check valve, said upper one way valve allowing flow from the lower chamber to the upper chamber when said damping fluid blocking means is restricting flow of damping fluid from the upper chamber to the lower chamber, and said lower one way valve allowing flow from the upper chamber to the lower chamber when said damping fluid blocking means is restricting flow from lower chamber to the upper chamber, and said damping fluid blocking means comprising means to close one of either said upper one way check valve and said lower one way check valve.

8. The device of claim 7, further comprising a pair of one way pressure relief valves mounted in the piston to allow flow of damping fluid between the upper chamber and the lower chamber in the reactive direction when the piston reaches a predetermined limit of travel.

9. The device of claim 7, further comprising a pair of branch conduits, each of said pair of branch conduits connecting said external conduit to one of the upper chamber and the lower chamber, where the piston may be positioned between said external conduit and one of said pair of branch conduits such that damping fluid may flow freely between the upper chamber and lower chamber.

10. The device of claim 1, where said damping fluid blocking means comprises a pair of solenoid valves controlled by said inertia sensing means.

11. The device of claim 1, further comprising a one way pressure relief valve communicating with said external conduit which allows flow from the lower chamber to the upper chamber under high pressure conditions above a predetermined limit.

12. The device of claim 1, further comprising a restrictive flow orifice positioned within each of said branch conduits, where said restrictive flow orifice remains open and reduces the flow of said damping fluid between said upper chamber and said lower chamber.

13. The device of claim 1, where said travel limiting means comprises a groove cut into the interior wall of said cylinder and extending in the axial direction a distance greater than the height of said piston.

14. The device of claim 1, where said travel limiting means comprises multiple grooves cut into the interior wall of said cylinder and extending in the axial direction a distance greater than the height of said piston.

15. The device of claim 1, where said travel limiting means comprises a conduit mounted onto said cylinder and having a pair of openings into either said upper chamber or said lower chamber, where the distance separating said pair of openings is greater than the height of said piston.

16. The device of claim 1, where said cylinder comprises an inner wall and an outer wall defining a flow path and where said travel limiting means comprises a pair of openings positioned in said inner wall of either said upper chamber or said lower chamber, where the distance separating said pair of openings is greater than the height of said piston.

\* \* \* \* \*